Patented Apr. 26, 1938

2,115,514

UNITED STATES PATENT OFFICE 2,115,514

LAMINATED ARTICLE

Bozetech C. Bren, Verona, N. J., assignor, by mesne assignments, to E. I. du Pont de Nemours & Company, Wilmington, Del., a corporation of Delaware No Drawing. Application November 7, 1935, Serial No. 48,626

5 Claims. (Cl. 49—81)

This invention relates to laminated articles and, more particularly, to laminated glass, i. e., safety glass, and the composition of the interlayer sheeting used therein. The invention is concerned with interlayer compositions comprising cellulose acetate.

For a thoroughly reliable safety glass, it is necessary that the interlayer should not become brittle at winter temperatures nor unduly soft at summer temperatures. Further the interlayer must be clear, substantially colorless, resistant to deterioration from sunlight, and free from the tendency to exude plasticizer under conditions of high humidity. It must also be adapted for laminating and have no deleterious effect upon the usual edge sealing materials. Heretofore, cellulose acetate compositions for interlayer sheeting have left much room for improvement with respect to the above characteristics, particularly as to the effect of winter and summer temperatures.

An object of the present invention is to provide a laminated article of superior qualities. A further and important object is to provide an interlayer sheeting having the requisite characteristics set forth above. A still further object is to provide a cellulose acetate interlayer sheet that will not become brittle at winter temperatures, unduly soft at summer temperatures, and will not exude plasticizer under conditions of high humidity. Other objects of the invention will be apparent from the description given hereinafter.

The above objects are accomplished according to the present invention by the use of an interlayer for safety glass and other laminated articles comprising 100 parts of cellulose acetate having an acetyl number of 51–54.5 and 80–100 parts of dimethyl phthalate as a plasticizer therefor. All parts given herein are by weight.

The cellulose acetates of the range of acetyl number in question are those ordinarily referred to as "plastics type" and "rayon type", the use of which in plastics has been preferred over that of those of higher acetyl number because of more convenient solubility characteristics and generally superior toughness. The expression "cellulose acetate having an acetyl number of 51–54.5" is used throughout the specification and claims to denote a cellulose acetate of 51–54.5% acetyl value, calculated as acetic acid.

The present invention resides in the combination of the particular type of cellulose acetate and plasticizer described above in the proportions specified. Where a plastic sheet must possess so many and different characteristics as a safety glass interlayer sheet and the latitude in each property that can be safely tolerated, is so narrow, the variation in the composition of the interlayer is limited and these limitations are of the essence of the invention.

It has been discovered through testing that, as regards the important property of cold toughness, i. e., resistance to becoming brittle at low temperatures, an interlayer containing 80–100 parts of dimethyl phthalate per 100 parts of cellulose acetate of the type herein described is highly satisfactory and that even a higher proportion of dimethyl phthalate may be used. Break tests carried out at −5° C. by dropping a 1½ pound steel ball a distance of 3 feet on the laminated panes were employed to determine this, a satisfactory break being one in which no pieces separate from the interlayer. However, where a higher proportion of dimethyl phthalate than 100 parts to 100 parts of cellulose acetate was used, the resistance to softening at summer temperatures was not satisfactory. It was further discovered that, within the proportion range given, the resistance to softening at summer temperatures was entirely satisfactory, as were the other properties of the interlayer.

As will be understood by those skilled in the art, the interlayer sheets may be manufactured without difficulty by the ordinary cake pressing procedure or by extrusion, and the interlayer sheet may be bonded with one or more sheets of glass, or other brittle material, by the ordinary technique, either without auxiliary adhesives or with the aid of known adhesives.

The following specific examples are given in order to illustrate the invention:

Example 1

The starting composition was as follows:

| | Parts |
|---|---|
| Cellulose acetate | 100 |
| Dimethyl phthalate | 80 |
| Denatured alcohol | 50 |
| C. P. acetone | 8 |

The ingredients were colloided in a Werner-Pfleiderer mixer, filtered by hydraulic pressure through heavy muslin, rolled to remove excess solvent, consolidated by heat and pressure, and from the resulting block were sliced sheets of approximately 0.025" thickness. The sheets were then seasoned, i. e., treated to remove substantially all of the volatiles but no substantial part of the plasticizer, according to ordinary practice. The sheets were then laminated between glass plates without the use of an adhesive by subjecting to a temperature of about 145° C. and a pressure of 150 pounds per square inch.

In the following specific examples, the procedure was the same as that used in Example 1 and, accordingly, only the compositions used are given:

*Example 2*

| | Parts |
|---|---|
| Cellulose acetate | 100 |
| Dimethyl phthalate | 85 |
| Denatured alcohol | 50 |
| C. P. acetone | 8 |

*Example 3*

| | Parts |
|---|---|
| Cellulose acetate | 100 |
| Dimethyl phthalate | 90 |
| Denatured alcohol | 50 |
| C. P. acetone | 5 |

*Example 4*

| | Parts |
|---|---|
| Cellulose acetate | 100 |
| Dimethyl phthalate | 95 |
| Denatured alcohol | 50 |
| C. P. acetone | 5 |

*Example 5*

| | Parts |
|---|---|
| Cellulose acetate | 100 |
| Dimethyl phthalate | 100 |
| Denatured alcohol | 50 |

*Example 6*

A composition comprising:

| | Parts |
|---|---|
| Cellulose acetate | 100 |
| Dimethyl phthalate | 86 |
| Denatured alcohol | 67 |
| C. P. acetone | 20 | was colloided and filtered as in the procedure for Example 1 and the resulting colloid was then extruded under pressure in the form of a wide web through an orifice. The balance of the procedure was the same as in Example 1.

The above examples are merely illustrative and the present invention comprises the use in a laminated article of an interlayer sheet comprising 100 parts of cellulose acetate having an acetyl number of 51–54.5 and 80–100 parts of dimethyl phthalate as a plasticizer therefor. In the above examples the cellulose acetate in each instance was of the type coming within the specified range.

Obviously, other volatile solvents may be employed and the proportion of volatile solvent may be varied without affecting the present invention, since it is routine practice to remove substantially all of the volatile solvent prior to lamination of the plastic interlayer sheet with the glass sheets, or the like. Also, the thickness of the interlayer sheet may be considerably varied, a thickness of 0.025" to 0.030" being usual, although greater or lesser thicknesses may be used.

The interlayer sheets of compositions according to the present invention are readily made and of desirable pliability and of the toughness necessary for proper protective functioning. The toughness is retained at winter temperatures and at summer temperatures and the sheeting is not subject to distortion by flow at summer temperatures. Moreover, the plasticizer does not exude even under conditions of relatively high humidity and this is an advantage because the sheets are not sticky and, accordingly, the packing and shipping of the interlayer sheets offer no difficulty. The interlayer sheets are well adapted to be readily and securely bonded to the glass, either with or without the use of auxiliary adhesives, by known and feasible technique.

A particular advantage of the present invention is that sheets are not sticky and for that reason can be handled expeditiously. A further and most important advantage of the present invention is that it provides an interlayer sheet which is tough and functions properly at the extreme winter and summer temperatures which, of course, is an absolute necessity for any safety glass that is completely reliable.

As many apparently widely different embodiments of this invention may be made without departing from the spirit and scope thereof, it is to be understood that the invention is not limited to the specific embodiments thereof except as defined in the appended claims.

I claim:

1. Laminated glass comprising a sheet of glass and, bonded thereto, a plastic sheet comprising 100 parts of cellulose acetate having an acetyl number of 51–54.5 and 80–100 parts of dimethyl phthalate as a plasticizer therefor.

2. Laminated glass comprising two sheets of glass united by an interlayer sheet comprising 100 parts of cellulose acetate having an acetyl number of 51–54.5 and 80–100 parts of dimethyl phthalate as a plasticizer therefor.

3. Laminated glass comprising a sheet of glass and, bonded thereto, a plastic sheet comprising 100 parts of cellulose acetate having an acetyl number of 51–54.5 and approximately 85 parts of dimethyl phthalate as the plasticizer therefor.

4. A plastic interlayer sheet for use in laminated glass, said sheet comprising 100 parts of cellulose acetate having an acetyl number of 51–54.5 and 80–100 parts of dimethyl phthalate as a plasticizer therefor.

5. A plastic interlayer sheet for use in laminated glass, said sheet comprising 100 parts of cellulose acetate having an acetyl number of 51–54.5 and approximately 85 parts of dimethyl phthalate as a plasticizer therefor.

BOZETECH C. BREN.